United States Patent
Mbouombouo et al.

(10) Patent No.: US 7,181,712 B2
(45) Date of Patent: Feb. 20, 2007

(54) METHOD OF OPTIMIZING CRITICAL PATH DELAY IN AN INTEGRATED CIRCUIT DESIGN

(75) Inventors: Benjamin Mbouombouo, San Jose, CA (US); Weidan Li, San Jose, CA (US); Dana Ahrens, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 147 days.

(21) Appl. No.: 10/975,981

(22) Filed: Oct. 27, 2004

(65) Prior Publication Data

US 2006/0090145 A1    Apr. 27, 2006

(51) Int. Cl.
*G06F 17/50* (2006.01)
(52) U.S. Cl. .............................................. 716/6; 716/2
(58) Field of Classification Search .................... 716/2, 716/6, 12
See application file for complete search history.

(56) References Cited

U.S. PATENT DOCUMENTS

| | | | |
|---|---|---|---|
| 5,724,250 A * | 3/1998 | Kerzman et al. | 716/3 |
| 6,378,109 B1 | 4/2002 | Young et al. | |
| 6,480,998 B1 | 11/2002 | Mukherjee et al. | |
| 6,590,419 B1 * | 7/2003 | Betz et al. | 326/47 |
| 6,810,505 B2 | 10/2004 | Tetelbaum et al. | |
| 6,907,590 B1 | 6/2005 | Al-Dabagh et al. | |
| 2004/0103386 A1 | 5/2004 | Becer et al. | |

* cited by examiner

*Primary Examiner*—Thuan Do
(74) *Attorney, Agent, or Firm*—Eric J. Whitesell

(57) ABSTRACT

A method and computer program product for optimizing critical path delay in an integrated circuit design include steps of: (a) receiving as input an integrated circuit design; (b) performing a timing/crosstalk analysis to identify each timing critical net in the integrated circuit design; (c) selecting an optimum interconnect configuration for minimizing path delay in each timing critical net; (e) performing a detailed routing that includes the selected optimum interconnect configuration for each timing critical net; and (f) generating as output the detailed routing.

4 Claims, 4 Drawing Sheets

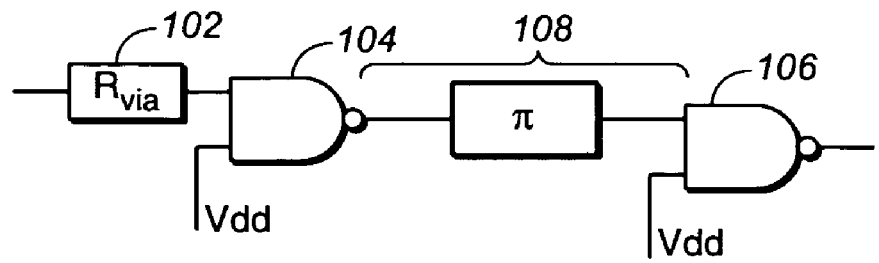
FIG._1
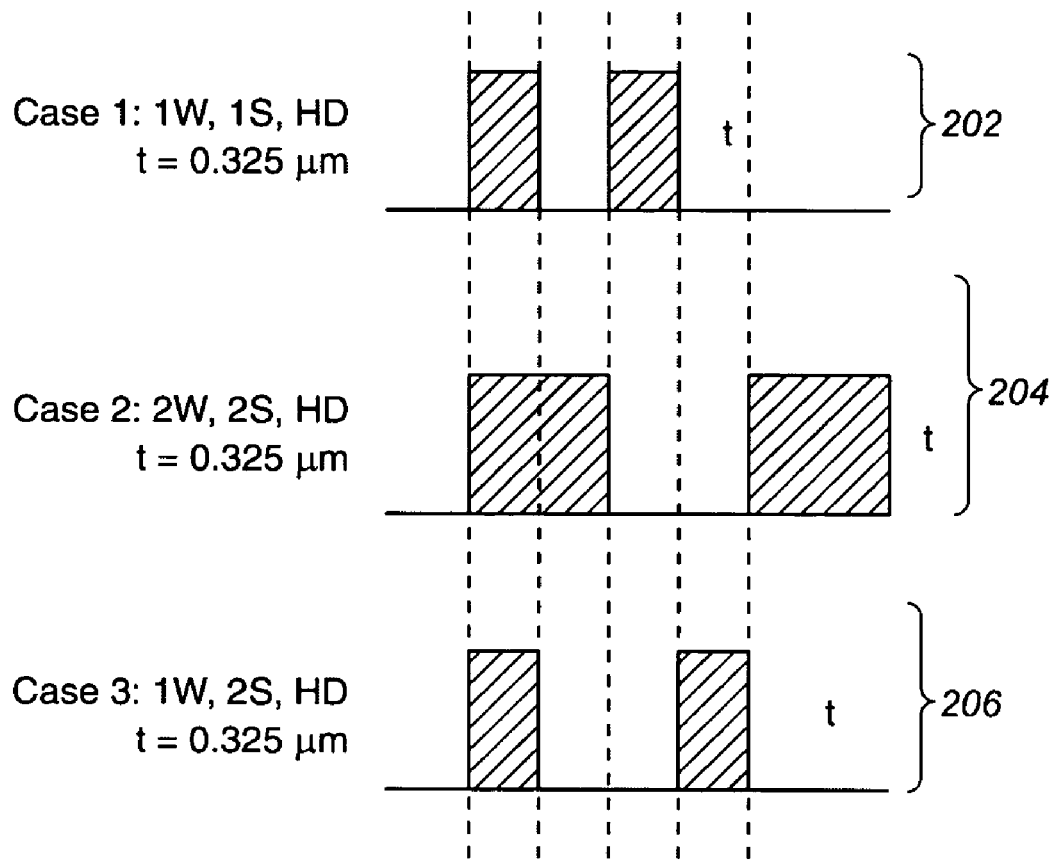
FIG._2

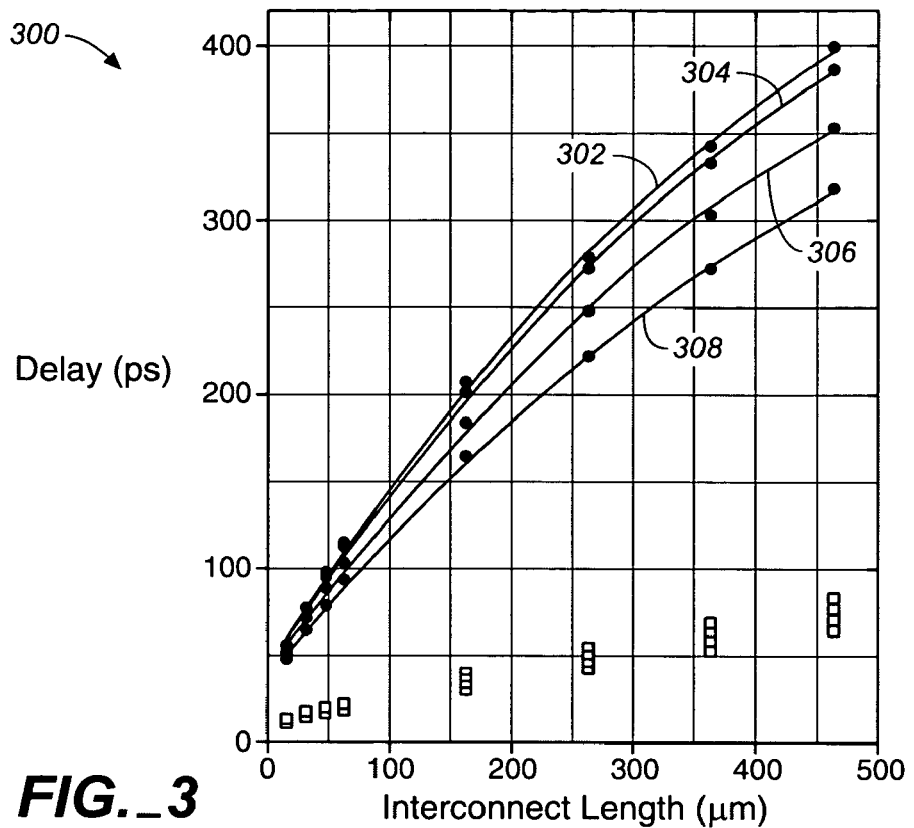
FIG._3
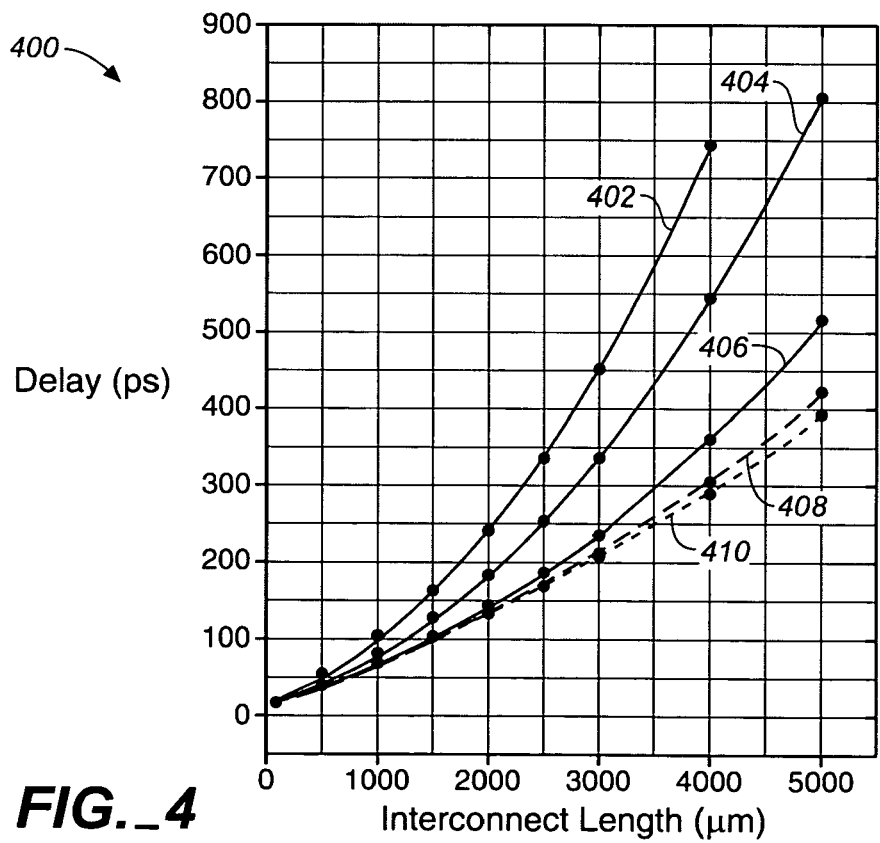
FIG._4

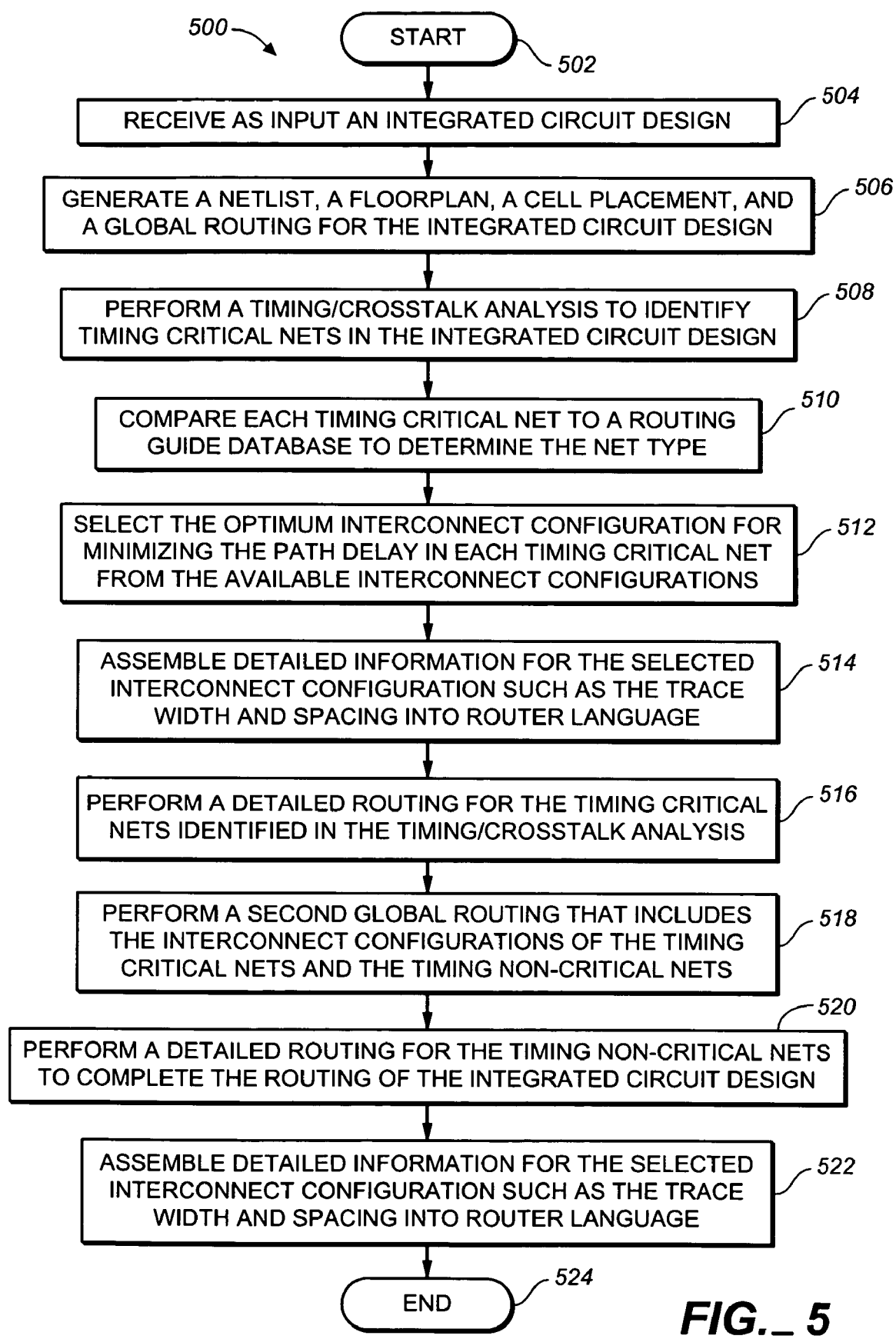
FIG._ 5

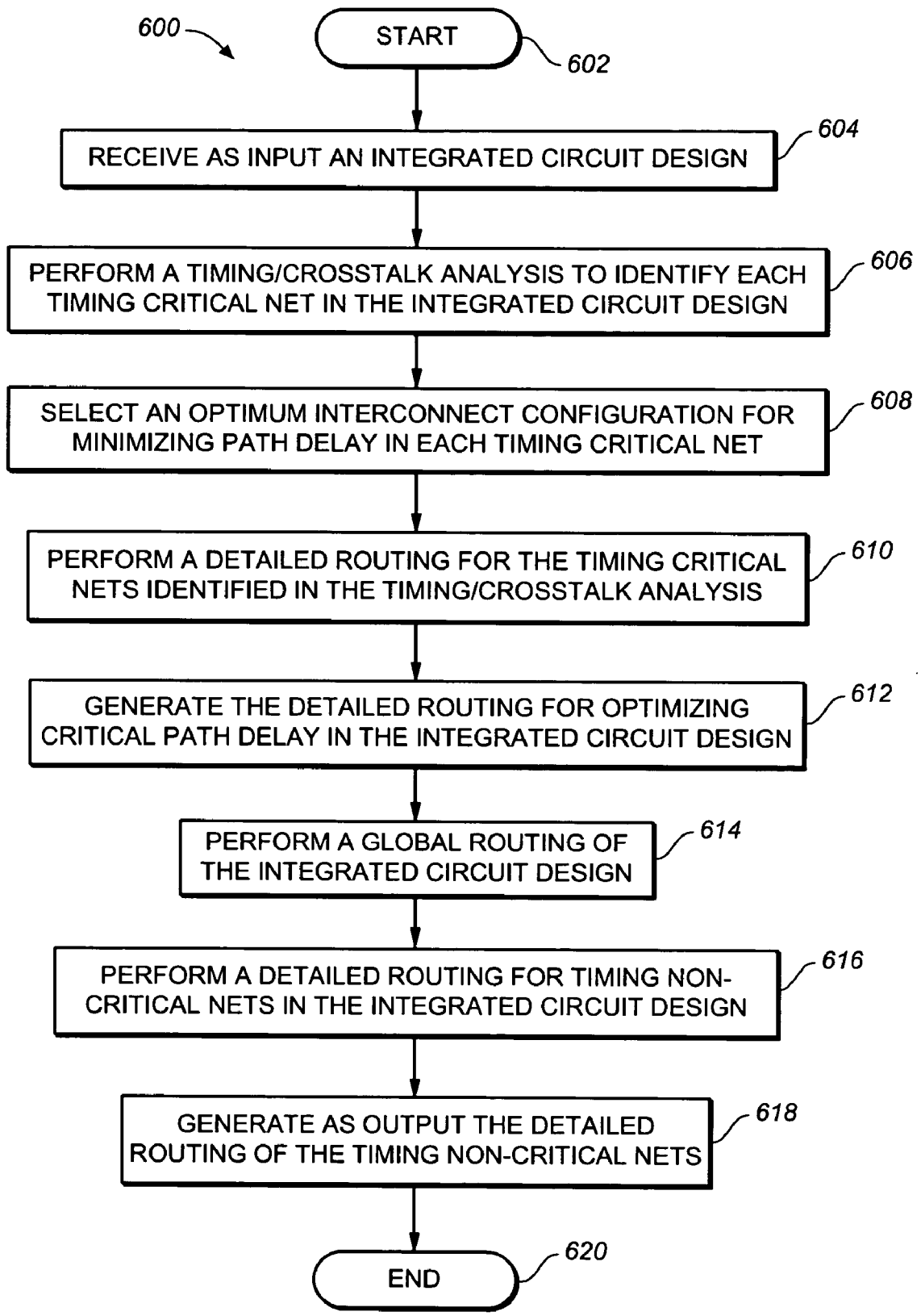
FIG._6

METHOD OF OPTIMIZING CRITICAL PATH DELAY IN AN INTEGRATED CIRCUIT DESIGN

BACKGROUND OF THE INVENTION

1. Field of the Invention

The present invention is directed to the design and manufacture of integrated circuits. More specifically, but without limitation thereto, the present invention is directed to selecting an optimum interconnect configuration for a critical path in an integrated circuit design.

2. Description of Related Art

In the aggressive scaling used in deep submicron integrated circuit design, the interconnect delay becomes increasingly important. For example, a transistor in 90 nanometer technology is about 40 percent faster than that in 130 nanometer technology of the previous generation. However, the overall chip performance of the 90 nanometer technology barely meets that of the previous generation, primarily because of the interconnect delay. In 90 nanometer integrated circuit technology and deeper, the interconnect delay plays an increasingly important role in timing closure of the integrated circuit design.

SUMMARY OF THE INVENTION

In various embodiments, a method and computer program product for optimizing critical path delay in an integrated circuit design include steps of:
(a) receiving as input an integrated circuit design;
(b) performing a timing/crosstalk analysis to identify each timing critical net in the integrated circuit design;
(c) selecting an optimum interconnect configuration for minimizing path delay in each timing critical net;
(e) performing a detailed routing that includes the selected optimum interconnect configuration for each timing critical net; and
(f) generating as output the detailed routing.

BRIEF DESCRIPTION OF THE DRAWINGS

The embodiments described herein are illustrated by way of example and not limitation in the accompanying figures, in which like references indicate similar elements throughout the several views of the drawings, and in which:

FIG. 1 illustrates a schematic of an example of a path in a net that requires optimization;

FIG. 2 illustrates a graph of three different types of interconnect configuration for the critical path of FIG. 1;

FIG. 3 illustrates a graph of interconnect configuration vs. interconnect length for shorter interconnect lengths;

FIG. 4 illustrates a graph of interconnect configuration vs. interconnect length for longer interconnect lengths;

FIG. 5 illustrates a flow chart of a method of optimizing critical path delay in an integrated circuit design; and FIG. 6 illustrates a flow chart for a method of optimizing critical path delay in an integrated circuit design for a computer program product.

Elements in the figures are illustrated for simplicity and clarity and have not necessarily been drawn to scale. For example, the dimensions of some elements in the figures may be exaggerated relative to other elements to point out distinctive features in the illustrated embodiments.

DESCRIPTION OF THE ILLUSTRATED EMBODIMENTS

Previous methods used in optimizing an integrated circuit design to achieve timing closure do not address directly the structure of the interconnects. As a result, the optimization may not be effective, and often incurs a power consumption penalty.

FIG. 1 illustrates a schematic 100 of an example of a path in a net that requires optimization. Shown in FIG. 1 are a via 102, logic gates 104 and 106, and a critical path 108.

In FIG. 1, the critical path 108 is identified by a net delay that is 90 percent or more of a clock period. Generally, less than 10 percent of the nets in an integrated circuit design have critical paths due to efficient cell placement criteria. A net that includes a critical path is called a timing critical net.

FIG. 2 illustrates a graph 200 of three different types of interconnect configuration for the critical path of FIG. 1. Shown in FIG. 2 are a 1-wide, 1-space interconnect configuration 202, a 2-wide, 2-space interconnect configuration 204, and a 1-wide, 2-space interconnect configuration 206.

Each technology defines a minimum pitch size for each layer of metal wires as a minimum width plus a minimum space. For example, for a minimum pitch size of 325 microns, the minimum or 1-wide trace width would be 162.5 microns, and the minimum or 1-space spacing between adjacent traces would also be 162.5 microns. The minimum pitch configuration is the 1-wide, 1-space interconnect configuration 202. The 1-wide, 2-space interconnect configuration 206 has a minimum trace width and a spacing that is twice the minimum spacing. The 2-wide, 2-space interconnect configuration 204 has a trace width that is twice the minimum trace width and a spacing that is twice the minimum spacing.

The propagation delay of a loaded interconnect may be expressed approximately as $$t_{delay} = \frac{V_{dd}}{I_{sat}}(C_L L + C_T) + (R_L L)(0.4 C_L + C_T) \quad (1)$$

where
$C_L$ is capacitance per unit of interconnect length,
$R_L$ is resistance per unit of interconnect length,
$C_T$ is a transistor gate load capacitance, and
L is the interconnect length.

Based on the physical length L of the wire interconnect and the strength of the driver that drives the interconnect, interconnects may be grouped into different categories. For short nets, the first term of equation (1) is predominant, and the interconnect delay is roughly linear with the interconnect length L. On the other hand, for long nets, the second term of equation (1) is predominant, and the interconnect delay is roughly proportional to the square of the interconnect length L.

Experimental results have shown that a 19 percent improvement in interconnect delay may be achieved for short nets by using the 1-wide, 2-space interconnect configuration, and that a 40 percent improvement in interconnect delay may be achieved for long nets by using the 2-wide, 2-space interconnect configuration.

FIG. 3 illustrates a graph 300 of interconnect configuration vs. interconnect length for shorter interconnect lengths. Shown in FIG. 3 are a curve 302 for a 1-wide, 1-space interconnect configuration, a curve 304 for a 1-wide, 2-space interconnect configuration, a curve 306 for a 2-wide, 1-space interconnect configuration, and a curve 308 for a 2-wide, 2-space interconnect configuration.

In FIG. 3, the dominance of the first term of equation (1) is evident from the nearly linear curves 302, 304, 306 and 308 of each of the interconnect configurations.

FIG. 4 illustrates a graph 400 of interconnect configuration vs. interconnect length for longer interconnect lengths. Shown in FIGS. 3 and 4 are a curve 402 for a 1-wide, 1-space interconnect configuration, a curve 404 for a 1-wide, 2-space interconnect configuration, a curve 406 for a 2-wide, 1-space interconnect configuration, a curve 408 for a 2-wide, 2-space interconnect configuration, and a curve 410 for a 4-wide, 2-space interconnect configuration.

In FIG. 4, the dominance of the second term of equation (1) is evident from the parabolic curves 402, 404, 406, 408 and 410 of each of the interconnect configurations.

By selecting an interconnect configuration for each timing critical net that is appropriate to the net timing information, the net driver information, and the net physical information, the timing constraints of an integrated circuit design may be met without increasing power consumption.

In one embodiment, a method for optimizing critical path delay in an integrated circuit design includes steps of:
(a) receiving as input an integrated circuit design;
(b) performing a timing/crosstalk analysis to identify each timing critical net in the integrated circuit design;
(c) selecting an optimum interconnect configuration for minimizing path delay in each timing critical net;
(e) performing a detailed routing that includes the selected optimum interconnect configuration for each timing critical net; and
(f) generating as output the detailed routing.

FIG. 5 illustrates a flow chart 500 of a method of optimizing critical path delay in an integrated circuit design.

Step 502 is the entry point of the flow chart 500.

In step 504, an integrated circuit design is received as input, for example, as register transfer level (RTL) code.

In step 506, a netlist, a floorplan, a cell placement, and a global routing are generated for the integrated circuit design according to well known techniques.

In step 508, a timing/crosstalk analysis is performed according to well known techniques to identify timing critical nets in the integrated circuit design.

Steps 510 through 514 are performed for each critical net identified in the timing/crosstalk analysis.

In step 510, each timing critical net is compared to a routing guide database to determine the net type. For example, the net type may be a short net or a long net. The routing guide database is generated for each technology, for example, using equation (1) to determine the appropriate interconnect configuration of trace width, trace spacing, and driver strength for a range of interconnect lengths.

In step 512, the optimum interconnect configuration for minimizing the path delay in each timing critical net is selected from the available interconnect configurations, such as the examples described above. Other interconnect configurations may be used to practice various embodiments within the scope of the appended claims.

In step 514, a routing guide generator assembles detailed information for the selected interconnect configuration such as the trace width and spacing into router language according to well known programming techniques.

In step 516, a detailed routing is performed for the timing critical nets identified in the timing/crosstalk analysis.

In step 518, a second global routing is performed that includes the interconnect configurations of the timing critical nets and the remaining nets, that is, the timing non-critical nets.

In step 520, a detailed routing is performed for the timing non-critical nets to complete the routing of the integrated circuit design.

In step 522, the routing of the integrated circuit design is generated as output including the interconnect configurations selected for the timing critical nets to optimize critical path delays.

Step 524 is the exit point of the flow chart 500.

Although the method illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation.

The steps described above with regard to the flow chart 500 may also be implemented by instructions performed on a computer. The instructions may be embodied in a medium such as a disk, CD-ROM, or other computer readable media according to well known computer programming techniques.

In another embodiment, a computer program product includes a medium for embodying a computer program for input to a computer and a computer program embodied in the medium for causing the computer to perform steps of:
(a) receiving as input an integrated circuit design;
(b) performing a timing/crosstalk analysis to identify each timing critical net in the integrated circuit design;
(c) selecting an optimum interconnect configuration for minimizing path delay in each timing critical net;
(e) performing a detailed routing that includes the selected optimum interconnect configuration for each timing critical net; and
(f) generating as output the detailed routing for optimizing critical path delay in the integrated circuit design.

FIG. 6 illustrates a flow chart 600 for a method of optimizing critical path delay in an integrated circuit design for a computer program product.

Step 602 is the entry point of the flow chart 600.

In step 604, an integrated circuit design is received as input.

In step 606, a timing/crosstalk analysis is performed to identify each timing critical net in the integrated circuit design.

In step 608, an optimum interconnect configuration is selected for minimizing path delay in each timing critical net.

In step 610, a detailed routing is performed that includes the selected optimum interconnect configuration for each timing critical net.

In step 612, the detailed routing for optimizing critical path delay in the integrated circuit design is generated as output.

In step 614, a global routing of the integrated circuit design is performed.

In step 616, a detailed routing for timing non-critical nets in the integrated circuit design is performed.

In step 618 the detailed routing of the timing non-critical nets is generated as output.

Step 620 is the exit point of the flow chart 600.

While the invention herein disclosed has been described by means of specific embodiments and applications thereof, numerous modifications and variations could be made thereto by those skilled in the art without departing from the scope of the invention set forth in the following claims.

What is claimed is:

1. A computer program product comprising a computer readable medium for embodying a computer program for input to a computer and a computer program embodied in the medium for causing the computer to perform steps of:
   (a) receiving as input an integrated circuit design;
   (b) performing a timing/crosstalk analysis to identify each timing critical net in the integrated circuit design;
   (c) selecting an optimum interconnect configuration of trace width, trace spacing, and driver strength for minimizing path delay for each timing critical net;
   (e) performing a detailed routing that includes the selected optimum interconnect configuration for each timing critical net; and
   (f) generating as output the detailed routing for optimizing critical path delay in the integrated circuit design, step (c) further comprising selecting one of a 1-wide, 2-space interconnect and a 2-wide, 2-space interconnect.

2. A method comprising steps of:
   (a) receiving as input an integrated circuit design;
   (b) performing a timing/crosstalk analysis to identify each timing critical net in the integrated circuit design;
   (c) selecting an optimum interconnect configuration of trace width, trace spacing, and driver strength for minimizing path delay for each timing critical net;
   (e) performing a detailed routing that includes the selected optimum interconnect configuration for each timing critical net; and
   (f) generating as output the detailed routing for optimizing critical path delay in the integrated circuit design, step (c) further comprising selecting one of a 1-wide, 2-space interconnect and a 2-wide, 2-space interconnect.

3. A computer program product comprising a computer readable medium for embodying a computer program for input to a computer and a computer program embodied in the medium for causing the computer to perform steps of:
   (a) receiving as input an integrated circuit design;
   (b) performing a timing/crosstalk analysis to identify each timing critical net in the integrated circuit design;
   (c) selecting an optimum interconnect configuration of trace width, trace spacing, and driver strength for minimizing path delay for each timing critical net;
   (e) performing a detailed routing that includes the selected optimum interconnect configuration for each timing critical net; and
   (f) generating as output the detailed routing for optimizing critical path delay in the integrated circuit design, step (c) further comprising selecting one of a 1-wide, 1-space interconnect, a 1-wide, 2-space interconnect, a 2-wide, 1-space interconnect, a 2-wide, 2-space interconnect, and a 4-wide, 2-space interconnect.

4. A method comprising steps of:
   (a) receiving as input an integrated circuit design;
   (b) performing a timing/crosstalk analysis to identify each timing critical net in the integrated circuit design;
   (c) selecting an optimum interconnect configuration of trace width, trace spacing, and driver strength for minimizing path delay for each timing critical net;
   (e) performing a detailed routing that includes the selected optimum interconnect configuration for each timing critical net; and
   (f) generating as output the detailed routing for optimizing critical path delay in the integrated circuit design, step (c) further comprising selecting one of a 1-wide, 1-space interconnect, a 1-wide, 2-space interconnect, a 2-wide, 1-space interconnect, a 2-wide, 2-space interconnect, and a 4-wide, 2-space interconnect.

* * * * *